United States Patent
Makwinski et al.

(10) Patent No.: US 12,330,479 B2
(45) Date of Patent: Jun. 17, 2025

(54) HYBRIDIZED FUEL CELL TRANSPORT REFRIGERATION UNITS

(71) Applicant: Carrier Corporation, Palm Beach Gardens, FL (US)

(72) Inventors: Mark Makwinski, Cromwell, CT (US); Bart Antonie van Hassel, Weatogue, CT (US); Eric Peterson, East Longmeadow, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 178 days.

(21) Appl. No.: 18/173,251

(22) Filed: Feb. 23, 2023

(65) Prior Publication Data

US 2023/0271480 A1  Aug. 31, 2023

Related U.S. Application Data

(60) Provisional application No. 63/314,631, filed on Feb. 28, 2022.

(51) Int. Cl.
*B60H 1/32* (2006.01)
*B60H 1/00* (2006.01)
(Continued)

(52) U.S. Cl.
CPC .......... *B60H 1/3205* (2013.01); *B60H 1/005* (2013.01); *B60H 1/3226* (2013.01);
(Continued)

(58) Field of Classification Search
CPC .... B60H 1/3205; B60H 1/005; B60H 1/3226; B60H 2001/3292; B60H 1/32;
(Continued)

(56) References Cited

U.S. PATENT DOCUMENTS

| 10,240,847 B1 * | 3/2019 | Thomas, Jr. | ........... F25D 11/003 |
| 2020/0231041 A1 * | 7/2020 | Lavrich | ................... F25B 27/00 |

FOREIGN PATENT DOCUMENTS

| EP | 3674115 A1 * | 7/2020 | ......... B60H 1/00014 |
| WO | WO-2020068556 A1 * | 4/2020 | ......... B60H 1/00014 |

OTHER PUBLICATIONS

European Search Report for Application No. 23157959.0, Issued Jul. 28, 2023, 7 Pages.

* cited by examiner

*Primary Examiner* — Emmanuel E Duke
(74) *Attorney, Agent, or Firm* — CANTOR COLBURN LLP

(57) ABSTRACT

A transport refrigeration system including: a transport refrigeration unit configured to provide conditioned air to a refrigerated cargo space of a transport container; a fuel cell configured to provide electricity to the transport refrigeration unit; one or more supplemental power sources configured to provide supplemental electricity to the transport refrigeration unit; and a power management module configured to manage the electricity and the supplemental electricity provided to the transport refrigeration unit, wherein the power management module is configured to detect a condition of the transport refrigeration unit that requires supplemental electricity and provide the supplemental electricity to the transport refrigeration unit from the one or more supplemental power sources.

16 Claims, 3 Drawing Sheets

(51) Int. Cl.
*H01M 10/42* (2006.01)
*H01M 16/00* (2006.01)

(52) U.S. Cl.
CPC ....... *H01M 10/425* (2013.01); *H01M 16/003* (2013.01); *H01M 16/006* (2013.01); *B60H 2001/3292* (2013.01); *H01M 2010/4271* (2013.01); *H01M 2220/20* (2013.01); *H01M 2250/20* (2013.01)

(58) Field of Classification Search
CPC ............ B60H 1/00428; H01M 10/425; H01M 16/003; H01M 16/006; H01M 2010/4271; H01M 2220/20; H01M 2250/20; Y02T 10/88; B60R 16/03; B60R 16/033; B60P 3/20

See application file for complete search history.

HYBRIDIZED FUEL CELL TRANSPORT REFRIGERATION UNITS

CROSS-REFERENCE TO RELATED APPLICATIONS

This application claims the benefit of U.S. Provisional Application No. 63/314,631, filed Feb. 28, 2022, all of which are incorporated herein by reference in their entirety.

BACKGROUND

The embodiments herein generally relate to transport refrigeration and more specifically, the energy source of transport refrigeration units.

Refrigerated vehicles and trailers are commonly used to transport perishable goods. A transport refrigeration unit is commonly mounted to the vehicles or to the trailer in operative association with a cargo space defined within the vehicles or trailer for maintaining a controlled temperature environment within the cargo space.

Conventionally, transport refrigeration units used in connection with refrigerated vehicles and refrigerated trailers include a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On many commercially available transport refrigeration units the compressor, and typically other components of the transport refrigeration unit, is powered during transit by a prime mover, either through a direct mechanical coupling or a belt drive. Alternatively, the transport refrigeration unit may be electrically powered (e.g., using an alternating (AC) synchronous generator that generates AC power). The generated AC power is typically used to power an electric motor for driving the refrigerant compressor, and other components of the transport refrigeration unit. In a different electrically powered transport refrigeration unit, the AC generator may be replaced with a battery pack to provide power to the loads. The battery pack is a finite source of power. Accordingly, additional methods of providing clean power for a transport refrigeration unit is desired.

BRIEF DESCRIPTION

According to one embodiment, a transport refrigeration system is provided. The transport refrigeration system including: a transport refrigeration unit configured to provide conditioned air to a refrigerated cargo space of a transport container; a fuel cell configured to provide electricity to the transport refrigeration unit; one or more supplemental power sources configured to provide supplemental electricity to the transport refrigeration unit; and a power management module configured to manage the electricity and the supplemental electricity provided to the transport refrigeration unit, wherein the power management module is configured to detect a condition of the transport refrigeration unit that requires supplemental electricity and provide the supplemental electricity to the transport refrigeration unit from the one or more supplemental power sources.

In addition to one or more of the features described above, or as an alternative, further embodiments of may include that the one or more supplemental power sources only provide the supplemental electricity to the transport refrigeration unit during the condition of the transport refrigeration unit that requires supplemental electricity.

In addition to one or more of the features described above, or as an alternative, further embodiments of may include that the power management module is configured to command activation of the one or more supplemental power sources only during the condition of the transport refrigeration unit that requires supplemental electricity.

In addition to one or more of the features described above, or as an alternative, further embodiments of may include that the fuel cell also provides the electricity to the transport refrigeration unit during the condition of the transport refrigeration unit that requires supplemental electricity.

In addition to one or more of the features described above, or as an alternative, further embodiments of may include that the one or more supplemental power sources includes at least one of: an energy storage device configured to store electricity and provide electricity to the transport refrigeration unit; a thermal storage device configured to provide cooling for refrigerated cargo space of the transport container using a phase change material; or an electric generation device configured to generate electricity and provide the electricity to the transport refrigeration unit.

In addition to one or more of the features described above, or as an alternative, further embodiments of may include that the one or more supplemental power sources includes an energy storage device configured to store electricity and provide electricity to the transport refrigeration unit.

In addition to one or more of the features described above, or as an alternative, further embodiments of may include that the energy storage device includes at least one of a battery system or a capacitor.

In addition to one or more of the features described above, or as an alternative, further embodiments of may include that the one or more supplemental power sources includes an electric generation device configured to generate electricity and provide the electricity to the transport refrigeration unit.

In addition to one or more of the features described above, or as an alternative, further embodiments of may include that the electric generation device includes at least one of an axle generator or a hub generator.

In addition to one or more of the features described above, or as an alternative, further embodiments of may include that the condition of the transport refrigeration unit that requires supplemental electricity is at least one of a low load condition, a max load condition, or a rapid ramp condition.

According to another embodiment, a method of operating a transport refrigeration system is provided. The method including: providing electricity from a fuel cell to a transport refrigeration unit, the transport refrigeration unit configured to provide conditioned air to a refrigerated cargo space of a transport container; powering the transport refrigeration unit using the electricity from the fuel cell; detecting a condition of the transport refrigeration unit that requires supplemental electricity; providing supplemental electricity from one or more supplemental power sources to the transport refrigeration unit during the condition of the transport refrigeration unit that requires supplemental electricity; and powering the transport refrigeration unit using at least the supplemental electricity from the one or more supplemental power sources during the condition of the transport refrigeration unit that requires supplemental electricity.

In addition to one or more of the features described above, or as an alternative, further embodiments of may include that the one or more supplemental power sources only provide the supplemental electricity to the transport refrigeration unit during the condition of the transport refrigeration unit that requires supplemental electricity.

In addition to one or more of the features described above, or as an alternative, further embodiments of may include activating of the one or more supplemental power sources only during the condition of the transport refrigeration unit that requires supplemental electricity.

In addition to one or more of the features described above, or as an alternative, further embodiments of may include providing the electricity from the fuel cell to the transport refrigeration unit during the condition of the transport refrigeration unit that requires supplemental electricity; and powering the transport refrigeration unit using the supplemental electricity from the one or more supplemental power sources and the electricity from the fuel cell during the condition of the transport refrigeration unit that requires supplemental electricity.

In addition to one or more of the features described above, or as an alternative, further embodiments of may include that the one or more supplemental power sources includes at least one of: an energy storage device configured to store electricity and provide electricity to the transport refrigeration unit; a thermal storage device configured to provide cooling for refrigerated cargo space of the transport container using a phase change material; or an electric generation device configured to generate electricity and provide the electricity to the transport refrigeration unit.

In addition to one or more of the features described above, or as an alternative, further embodiments of may include that the energy storage device includes at least one of a battery system or a capacitor, or wherein the electric generation device includes at least one of an axle generator or a hub generator.

In addition to one or more of the features described above, or as an alternative, further embodiments of may include that the condition of the transport refrigeration unit that requires supplemental electricity is at least one of a low load condition, a max load condition, or a rapid ramp condition.

According to another embodiment, a computer program product tangibly embodied on a non-transitory computer readable medium is provided. The computer program product including instructions that, when executed by a processor, cause the processor to perform operations including: providing electricity from a fuel cell to a transport refrigeration unit, the transport refrigeration unit configured to provide conditioned air to a refrigerated cargo space of a transport container; powering the transport refrigeration unit using the electricity from the fuel cell; detecting a condition of the transport refrigeration unit that requires supplemental electricity; providing supplemental electricity from one or more supplemental power sources to the transport refrigeration unit during the condition of the transport refrigeration unit that requires supplemental electricity; and powering the transport refrigeration unit using at least the supplemental electricity from the one or more supplemental power sources during the condition of the transport refrigeration unit that requires supplemental electricity.

In addition to one or more of the features described above, or as an alternative, further embodiments of may include that the condition of the transport refrigeration unit that requires supplemental electricity is at least one of a low load condition, a max load condition, or a rapid ramp condition.

Technical effects of embodiments of the present disclosure include powering a transport refrigeration unit with a fuel cell and providing supplemental electricity from one or more supplemental sources.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments disclosed herein relate to powering a transport refrigeration unit with a fuel cell and providing supplemental electricity from one or more supplemental sources when the transport refrigeration unit may be in a condition that the fuel cell cannot handle on its own or a condition that can be more effectively and/or efficiently handled by supplementing the fuel cell's output.

Figure 1:
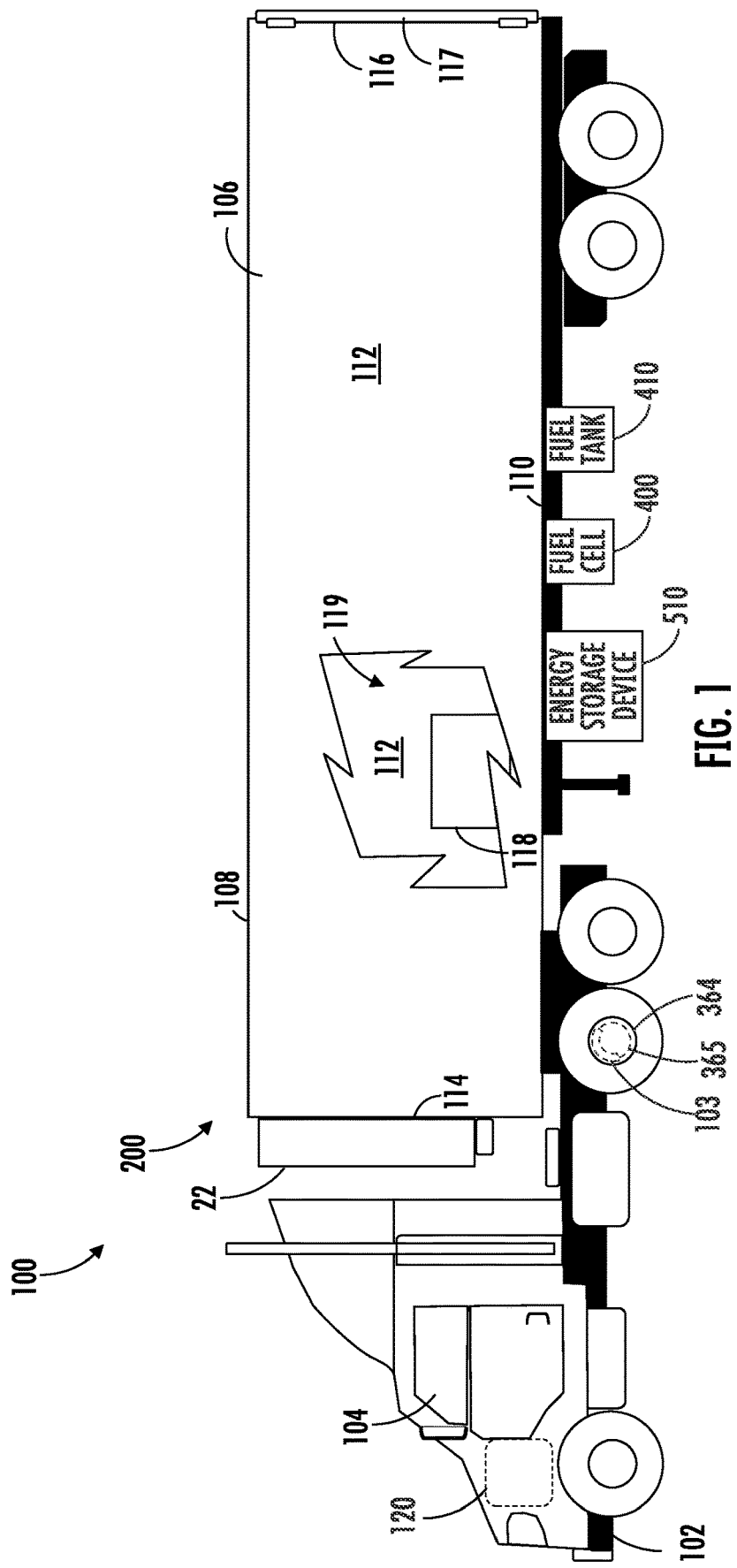
FIG. 1 is a schematic illustration of an exemplary transport refrigeration system, according to an embodiment of the present disclosure.
Figure 2:
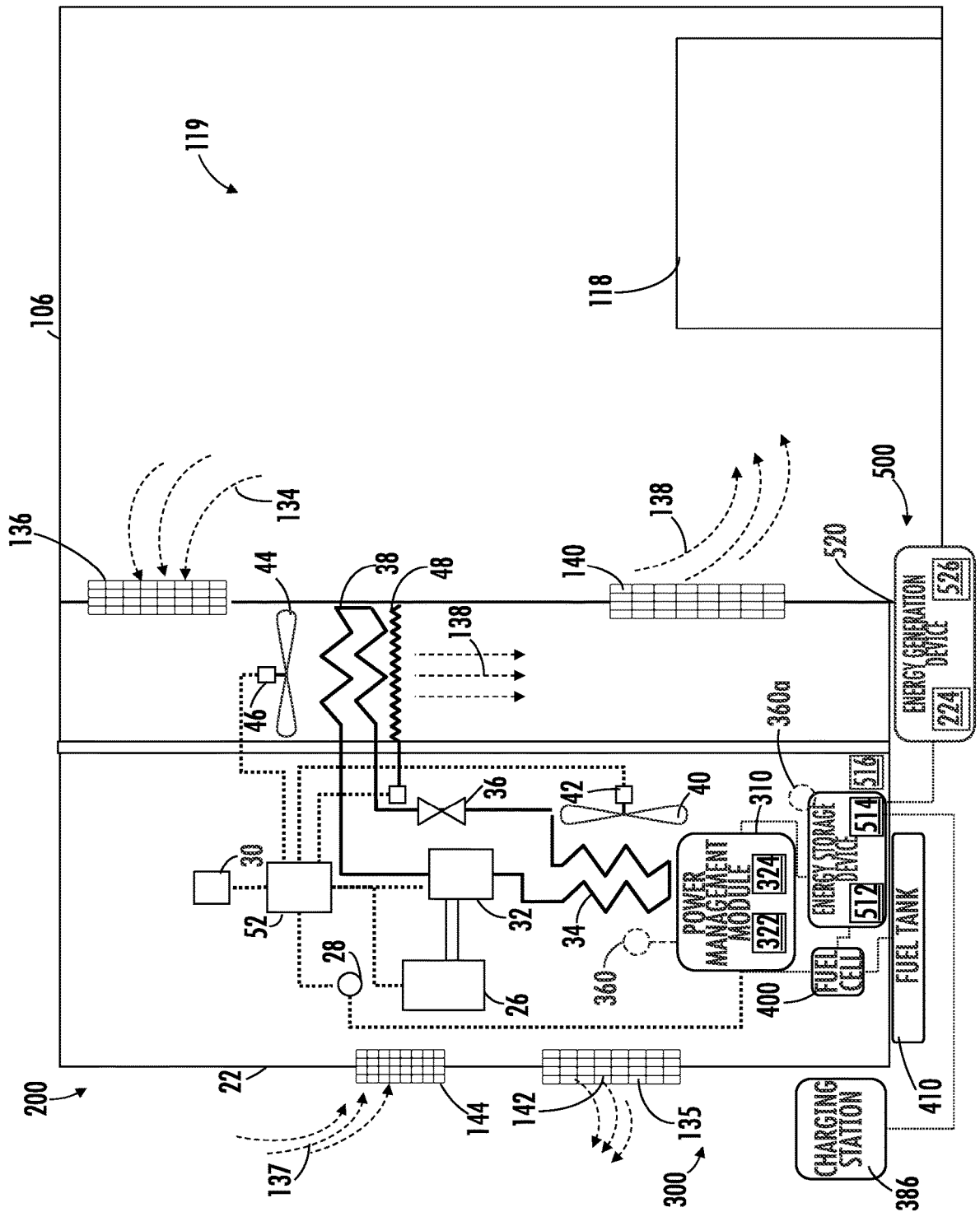
FIG. 2 is an enlarged schematic illustration of an exemplary transport refrigeration unit of the transport refrigeration system of FIG. 1, according to an embodiment of the present disclosure.

Referring to FIGS. 1 and 2, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure.

The transport refrigeration system 200 is being illustrated as a trailer system 100, as seen in FIG. 1. Although described herein that the transport refrigeration system 200 may be attached to a trailer, it should be appreciated that the transport refrigeration system 200 described herein may be suitable for any refrigerated cargo system (e.g., trailer, container, unit load device, etc.). When embodied as a trailer system 100, the trailer system 100 includes a vehicle 102 integrally connected to a transport container 106. The vehicle 102 may include an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, hydrogen, electricity from a fuel cell, a electricity from a hydrogen fueled proton exchange membrane (PEM) fuel cell, electricity from a battery, electricity from a generator, or any combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment, or a shipping container having a refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transport refrigeration unit 22, a refrigerant compression device 32, an electric motor 26 for driving the refrigerant compression device 32, and a controller 30. The transport refrigeration unit 22 is in operative association with the refrigerated cargo space 119 and is configured to provide conditioned air to the transport container 106. The transport refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transport refrigeration unit 22 is capable of providing a desired temperature, carbon dioxide, and humidity range.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The transport refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The transport refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the transport refrigeration unit 22 is operating in a subcritical refrigerant cycle or as a refrigerant gas cooler, such as if the transport refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air intake 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat absorption heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

Airflow is circulated into and through the refrigerate cargo space 119 of the transport container 106 by means of the transport refrigeration unit 22. A return airflow 134 flows into the transport refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The transport refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the transport refrigeration unit 22 can further be operated in reverse to warm the transport container 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the transport refrigeration unit 22.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the electric motor 26. The controller 30 may also be configured to provide a feedforward signal to the fuel cell 400 so that it will start up before the transport refrigeration unit 22 places a load on the fuel cell 400.

The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium. The controller 30 may have multiple inputs (e.g. analog, digital, others) and multiple outputs and a communication interface (e.g. CAN-bus, ethernet).

The transport refrigeration unit 22 is powered by a fuel cell 400 and/or an energy storage device 510. The fuel cell 400, associated fuel tanks 410, and energy storage device 510 may be attached to the trailer system 100. The fuel cell 400, associated fuel tanks 410, and energy storage device 510 may be attached to a bottom of the trailer system 100.

The fuel cell 400 may include an anode electrode and a cathode electrode separated by an electrolyte (not shown for simplicity). A reducing fluid such as hydrogen is supplied to the anode electrode, and an oxidant such as oxygen or air is supplied to the cathode electrode. In a cell utilizing a PEM as the electrolyte, the hydrogen electrochemically reacts at a catalyst surface of the anode electrode to produce hydrogen ions and electrons. The electrons are conducted to an external load circuit (e.g., the transport refrigeration unit 22 or energy storage device 510) and then returned to the cathode electrode, while the hydrogen ions transfer through the electrolyte to the cathode electrode, where they react with the oxidant and electrons to produce water and release thermal energy. A fuel tank 410 is configured to store and provide the reducing fluid to the fuel cell 400. In an embodiment, the reducing fluid is hydrogen.

There may be one or more fuel cells 400 and one or more fuel tanks 410. In one embodiment, the fuel cell 400 may be located inside the transport refrigeration unit 22, as shown in FIG. 2. In another embodiment, the fuel cell 400 may be located outside of the transport refrigeration unit 22, as shown in FIG. 1. The fuel cell 400 may be located under the transport container 106 of the trailer system 100.

In one embodiment, the fuel tank 410 may be located inside the transport refrigeration unit 22. In another embodiment, the fuel tank 410 may be located outside of the transport refrigeration unit 22, as shown in FIG. 2. The fuel tank 410 may be located under the transport container 106 of the trailer system 100, as shown in FIG. 1.

In one embodiment, the one or more supplemental power sources 500 may be located outside of the transport refrigeration unit 22, as shown in FIG. 1. In another embodiment, the one or more supplemental power sources 500 may be located within the transport refrigeration unit 22. The one or more supplemental power sources 500 may include an energy storage device 510, a thermal storage system 516, and/or an electric generation device 520. The fuel cell 400 may power the transport refrigeration unit 22 directly or may provide electricity to an energy storage device 510, which then provides power to the transport refrigeration unit 22.

The thermal storage system 516 does not directly provide electricity to the transport refrigeration unit 22 but rather the thermal storage system 516 may be used to save electricity used by the transport refrigeration unit 22 by providing supplemental or replacement heating or cooling to the transport container 106. A thermal storage system 516 may be present to sink electrical energy into in order to cool the transport container 106. The thermal storage system 516 may utilized a phase change material to provided cooling to the transport container 106. For example, the thermal storage system 516 may utilized electricity to change the phase change material from one phase to another phase to cool the transport container 106. The thermal storage system 516 may be an ice generation system to create ice to cool the transport container 106. The ice generation system may generate ice when electricity is available or plentiful to provide lasting cooling for the transport container 106 to conserve electricity later by reducing use of the compression device 32 for cooling.

The energy storage device 510 may include a battery system 512, a capacitor 514, and/or any other electricity storage system known to one of skill in the art. The battery system 512 may comprise, chemical batteries, lithium-ion batteries, solid state batteries, flow batteries, or any other type of battery known to one of skill in the art. The battery system 512 may employ multiple batteries organized into battery banks. The capacitor 514 may be an electrolytic capacitor, a mica capacitor, a paper capacitor a film capacitor, a non-polarized capacitor, a ceramic capacitor, or any type of capacitor known to one of skill in the art.

The electricity generated by the electric generation device 520 may charge the energy storage device 510 or directly power the transport refrigeration unit 22. The electric generation device 520 may include axle generator 524, hub generator 526, and/or any other electricity generation system known to one of skill in the art.

The axle generator 524 is configured to recover rotational energy when the transport refrigeration system 20 is decelerating or going downhill and convert that rotational energy to electrical energy, such as, for example, when the axle 365 of the trailer system 100 is rotating due to acceleration, cruising, or braking. The electricity generated by the axle generator 524 may be sent directly to the transport refrigeration unit 22, the energy storage device 510, or the thermal storage system 516. The axle generator 524 may be mounted on or operably connected to a wheel axle 365 of the trailer system 100. It is understood that the axle generator 524 may be mounted on any axle 365 of the trailer system 100 and the mounting location of the axle generator 524 illustrated in FIG. 1 is one example of a mounting location. The axle generator 524 may be operably connected to the axle 365 through at least one mechanical linkage, such as, for example a drive shaft, belt system, or gear system. The mechanical linkage configured to rotate the axle generator 524 as the axle 365 rotates when the axle generator 524 is activated. The axle generator 524 may comprise a single on-board, engine driven AC generator configured to generate alternating current (AC) power including at least one AC voltage at one or more frequencies. In an embodiment, the axle generator 524 may, for example, be a permanent magnet AC generator, asynchronous generator, or a synchronous AC generator. In another embodiment, the axle generator 524 may comprise a single on-board, engine driven DC generator configured to generate direct current (DC) power at at least one voltage.

The hub generator 526 is configured to recover rotational energy when the transport refrigeration system 20 is decelerating or going downhill and convert that rotational energy to electrical energy, such as, for example, when the wheel 364 of the trailer system 100 is rotating due to acceleration, cruising, or braking. The electricity generated by the hub generator 526 may be sent directly to the transport refrigeration unit 22, the energy storage device 510, or the thermal storage system 516. The hub generator 526 may be mounted on a wheel 364 of the trailer system 100. It is understood that the hub generator 526 may be mounted on any wheel 364 of the trailer system 100 and the mounting location of the hub generator 526 illustrated in FIG. 1 is one example of a mounting location. The hub generator 526 may be operably connected to the wheel 364 through at least one mechanical linkage, such as, for example a drive shaft, belt system, or gear system. The mechanical linkage configured to rotate the hub generator 526 as the wheel 364 rotates when the hub generator 526 is activated. The hub generator 526 may comprise a single on-board, engine driven AC generator configured to generate alternating current (AC) power including at least one AC voltage at one or more frequencies. In an embodiment, the hub generator 526 may, for example, be a permanent magnet AC generator, asynchronous generator, or a synchronous AC generator. In another embodiment, the hub generator 526 may comprise a single on-board, engine driven DC generator configured to generate direct current (DC) power at at least one voltage.

An inertial sensor 360 may be present and configured to detect at least one of a deceleration of the vehicle 102 and a downward pitch of the vehicle 102 (e.g., indicating the vehicle 102 is moving downhill). The inertial sensor 360 may be a 5-axis sensor. The inertial sensor 360 may be configured to detect three linear accelerations and two rotational accelerations. The three linear accelerations may be along an X-axis, a Y-axis, and a Z-axis of a three-dimensional Cartesian coordinate system. The rotational accelerations may be around two of the three axis of the three-dimensional cartesian coordinate system, such as, for example, the X-axis and the Z-axis. The inertial sensor 360 may accomplish this detection utilizing a plurality of connected sensors or a single sensor. In an embodiment, the inertial sensor 360 is a single sensor in electronic communication with a power management module 310. The power management module 310 is configured to activate the axle generator 524 and/or the hub generator 526 when the inertial sensor 360 detects at least one of the deceleration of the vehicle 102 and the downward pitch of the vehicle 102. The inertial sensor 360 may also include a GPS device in order to predict in advance at least one of the deceleration of the vehicle 102 and the downward pitch of the vehicle 102.

The energy storage device 510 may be charged by a stationary charging station 386 such as, for example a three-phase 460 Vac (60 Hz) or 400 Vac (50 Hz) power outlet. The charging station 386 may provide single phase (e.g., level 2 charging capability) or three phase AC power to the energy storage device 510. It is understood that the charging station 386 may have any phase charging and embodiments disclosed herein are not limited to single phase or three phase AC power. In an embodiment, the single phase AC power may be a high voltage DC power, such as, for example, 500 VDC. One function of the charging station 386 is to balance the cell voltage of individual cells of the battery system at some regular cadence.

The transport refrigeration unit 22 has a plurality of electrical power demand loads on the energy storage device 510, including, but not limited to, the electric motor 26 for the compression device 32, the drive motor 42 for the fan 40 associated with the refrigerant heat rejection heat exchanger 34, and the drive motor 46 for the fan 44 associated with the refrigerant heat absorption heat exchanger 38. As each of the fan motors 42, 46 and the electric motor 26 may be an AC motor or a DC motor, it is to be understood that various power converters 52, such as AC to DC rectifiers, DC to AC inverters, AC to AC voltage/frequency converters, DC to DC voltage converters, and filters, may be employed in connection with the energy storage device 150 as appropriate. In the depicted embodiment, the heater 48 also constitutes an electrical power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the refrigerant heat absorption heat exchanger 38. Additionally, the electric motor 26 being used to power the refrigerant compression device 32 constitutes a demand load. The refrigerant compression device 32 may comprise a single-stage or multiple-stage compressor such as, for example, a reciprocating compressor or a scroll compressor. The transport refrigeration system 200 may also include a voltage sensor 28 to sense the voltage and phase coming into the transport refrigeration unit 22. Additional power demand loads may include various controllers, battery chargers, stepper motor modules, display modules, power control modules, control box, refrigerant valves, coolant pumps, and any component of the transport refrigeration system 200 that may require power or accessories of 106, such as lift gate.

The power demand loads of the transport refrigeration unit 22 may be managed and fulfilled by an energy management system 300. The energy management system 300 may include the fuel cell 400 and/or the one or more supplemental power sources 500. The energy management system 300 includes a power management module 310 that is in communication with transport refrigeration unit 22, the fuel cell 400 and/or the one or more supplemental power sources 500.

The power management module 310 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The power management module 310 is configured to control electricity to transport refrigeration unit 22 from the fuel cell 400 and/or the one or more supplemental power sources 500.

The fuel cell 400 may be the main source of electricity for the transport refrigeration unit 22 and may provide all or a majority of the electricity for the transportation for the transport refrigeration unit 22 during normal operation. However, the fuel cell 400 may not be able to provide an appropriate amount of electricity to the transport refrigeration unit 22 during certain conditions, such as, when the transport refrigeration unit 22 is in a low load condition, during a rapid ramp condition (e.g., rapid pull down), at a max load condition, or other conditions. The fuel cells 400 may not handle low load conditions for the transport refrigeration unit 22 particularly well because some fuel cells 400 in one example may have issues with providing <25% of the rated power from their fuel cell system or 2 kWe of power from their fuel cell system in a low load condition as it could cause a very high cell voltage (>0.84V), which may be bad for the electrodes. Fuel cells 400 do not handle rapid ramp conditions for the transport refrigeration unit 22 particularly well because the fuel cells 400 cannot react fast to rapid changes of power needs. The power management module 310 is in communication with the controller 30 of the transport refrigeration unit 22 and the controller 30 will inform the power management module 310 of a low load condition or a rapid ramp condition. During a low load condition or a rapid ramp condition of the transport refrigeration unit 22, the power management module 310 is configured to provide all or a portion of the electricity demanded by the transport refrigeration unit 22 from the one or more supplemental power sources 500. For example, the fuel cell 400 may be configured to provide the electricity to the transport refrigeration unit 22 and the one or more supplemental power sources 500 may provide supplemental electricity.

A low load condition may be defined as when the transport refrigeration unit 22 is requiring a low load of electricity from the fuel cell 400. In on example a lower load be defined as less than 25% of the rated power of the fuel cell system or 2 kWe. A rapid ramp condition may be defined as when an inrush of current is required by the transport refrigeration unit 22. An inrush of current may occur when controller 30 turns on fans 40, 46 or the refrigeration compression device 32. While the fuel cell 400 may have some capacitance and can take care of some of the inrush current, the inrush currents can best be caught by the battery, as there is no time to adjust the air flow and hydrogen recirculation rate of the fuel cell system.

Supplemental electricity provided by one or more supplemental power sources 500 may during a max load condition allow peak power capability that is beyond that which the fuel cell 400 alone can provide. This boost capability may allow for the fitment of a smaller and less expensive fuel cell while still meeting all system load requirements.

The power management module 310 may also be in communication with the inertial sensor 360 if present. The inertial sensor 360 is configured to detect a deceleration of the vehicle 102. The inertial sensor 360 is in operative association with the vehicle 102 and may detect when a brake 103 of the vehicle 102 is being applied to slow the vehicle 102 and/or the vehicle 102 is decelerating without the brakes 103 being applied (i.e., driver lets foot off accelerator pedal). The inertial sensor 360 is in operative communication with the power management module 310 and the power management module 310 controls the operation of the inertial sensor 360.

The power management module 310 is configured to activate the axle generator 524 and/or the hub generator 526 when the deceleration is greater than a selected deceleration, which may indicate that some propulsion motor 320 rotation is no longer needed to drive the vehicle 102 and it is a good time to bleed off some rotational energy of the wheels 364 or axle 365 of the trailer system 100 using the axle generator 524 and/or the hub generator 526. Bleeding off rotational energy of the wheels 364 or axle 365 when the vehicle 102 is decelerating helps reduce any performance impact to the ability of the propulsion motor 320 to power the vehicle 102.

The inertial sensor 360 is also configured to detect a pitch angle of the vehicle 102. The power management module 310 is configured to activate the axle generator 524 and/or the hub generator 526 when the when the pitch angle is less than a selected pitch angle, which may indicate that some propulsion motor 320 rotation is no longer needed to drive the vehicle 102 and it is a good time to bleed off some rotational energy of the wheels 364 or axle 365 of the trailer system 100 using the axle generator 524 and/or the hub generator 526. For example, when the vehicle 102 is descending downhill with a negative pitch angle, gravity assists in driving the vehicle 102 downhill and the full capacity of the e rotational energy of the wheels 364 and axle 365 may no longer be needed to drive the vehicle 102. Bleeding off rotational energy of the wheels 364 or axle 365 when the vehicle 102 is descending downhill helps reduce any performance impact to the ability of the propulsion motor 320 to power the vehicle 102.

The axle generator 524 and/or the hub generator 526 may also include a rotational velocity sensor 360a configured to measure the rotational velocity of the electric generation device 540 (e.g., rotations per minute (RPM)). The rotational velocity sensor 360a is in communication with the power management module 310 and the power management module 310 may control the operation of the rotational velocity sensor 360a. The power management module 310 is configured to determine when the vehicle 102 is decelerating utilizing the inertial sensor 360 and/or the rotational velocity sensor 360a, which may indicate that some propulsion motor 320 rotation is no longer needed to drive the vehicle 102 (i.e., the vehicle 102 is going downhill or decelerating) and it is a good time to bleed off some rotational energy of the wheels 364 or axle 365 of the trailer system 100 using the axle generator 524 and/or the hub generator 526. Bleeding off rotational energy of the wheels 364 or axle 365 when the vehicle 102 is decelerating or going downhill helps reduce any performance impact to the ability of the propulsion motor 320 to power the vehicle 102.

In one embodiment, the rotational velocity sensor 360a may be a sensor mechanically connected to the generator 524, 526 to detect rotational velocity of the generator 524, 526. In another embodiment, the rotational velocity sensor 360a may be an electronic sensor electrically connected to the generator 524, 526 to detect rotational velocity of the generator 524, 526 by measuring the electrical frequency output of the generator 524, 526. In another embodiment, the rotational velocity sensor 360a may be an inverter connected to the generator 524, 526 to detect rotational velocity of the generator 524, 526 by measuring the electrical frequency output of the electric generation device 540. In yet another embodiment, the rotational velocity sensor 360a may be a wireless sensor capable of detecting rotational velocity of the generator 524, 526 wirelessly, such as, for example, RFID tracking, wireless capacitive sensor, wireless electromagnetic induction sensor, or any other wireless detection method known to one of skill in the art.

Figure 3:
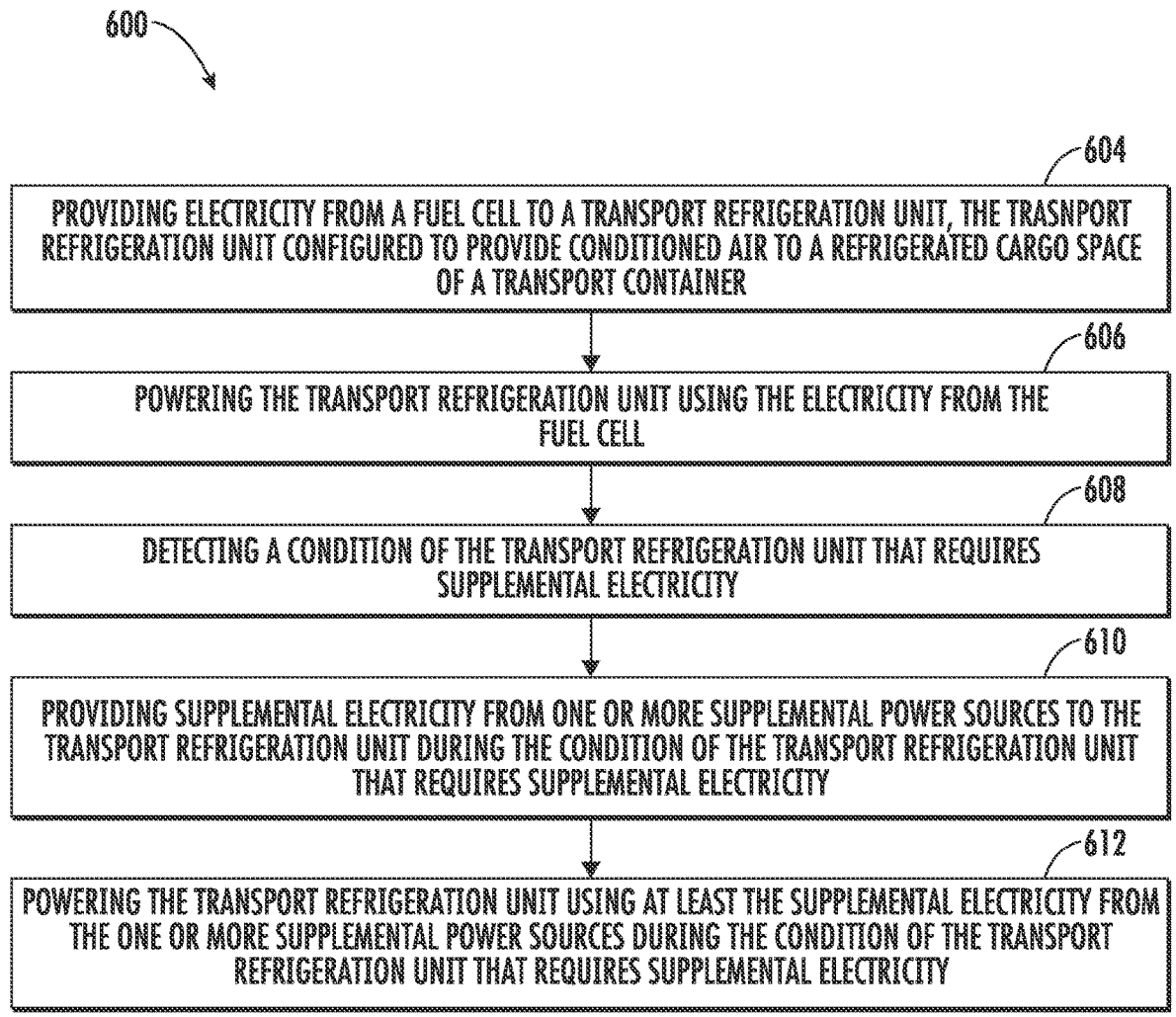
FIG. 3 is a flow process illustrating an exemplary method of operating the transport refrigeration system of FIGS. 1 and 2, according to an embodiment of the present disclosure.

Referring now to FIG. 3, with continued reference to FIGS. 1 and 2, a flow process of a method 600 of operating a transport refrigeration system 20 is illustrated, according to an embodiment of the present disclosure. In an embodiment, the method 600 may be performed by the power management module 310.

At block 604, electricity is provided from a fuel cell 400 to a transport refrigeration unit 22. The transport refrigeration unit 22 configured to provide conditioned air to a refrigerated cargo space 119 of a transport container 106. Prior to block 604, the fuel cell 400 requires some electricity from the energy storage device 510 to start up.

At block 606, the transport refrigeration unit 22 is powered using the electricity from the fuel cell 400.

At block 608, a condition of the transport refrigeration unit 22 that requires supplemental electricity is detected. The condition of the transport refrigeration unit 22 that requires supplemental electricity is at least one of a low load condition, a max load condition, or a rapid ramp condition At block 610, supplemental electricity is provided from one or more supplemental power sources 500 to the transport refrigeration unit 22 during the condition of the transport refrigeration unit 22 that requires supplemental electricity.

At block 612, the transport refrigeration unit 22 is powered using at least the supplemental electricity from the one or more supplemental power sources 500 during the condition of the transport refrigeration unit 22 that requires supplemental electricity. The one or more supplemental power sources 500 may include at least one of an energy storage device 510 configured to store electricity and provide electricity to the transport refrigeration unit 22 or an electric generation device 520 configured to generate electricity and provide the electricity to the transport refrigeration unit 22. In an embodiment, the energy storage device 510 includes at least one of a battery system 512, a capacitor 514, or a thermal storage system 518. In an embodiment, the electric generation device 520 includes at least one of an axle generator 524 or a hub generator 526.

In an embodiment, the one or more supplemental power sources 500 may only provide the supplemental electricity to the transport refrigeration unit 22 during the condition of the transport refrigeration unit 22 that requires supplemental electricity.

The method 600 may also include that the one or more supplemental power sources 500 is activated only during the condition of the transport refrigeration unit 22 that requires supplemental electricity.

The method 600 may further include that electricity is provided from fuel cell 400 to the transport refrigeration unit 22 during the condition of the transport refrigeration unit 22 that requires supplemental electricity and the transport refrigeration unit 22 is powered using the supplemental electricity from the one or more supplemental power sources 500 and the electricity from the fuel cell 400 during the condition of the transport refrigeration unit 22 that requires supplemental electricity.

The fuel cell 400 may be configured to provide the electricity to the transport refrigeration unit 22 during all other conditions of the transport refrigeration unit 22 other than the low load condition or the rapid ramp condition of the transport refrigeration unit 22. Further, the fuel cell 400 may be configured to provide all of the electricity required by the transport refrigeration unit 22 during all other conditions of the transport refrigeration unit 22 other than the low load condition or the rapid ramp condition of the transport refrigeration unit 22.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a transport refrigeration unit configured to provide conditioned air to a refrigerated cargo space of a transport container;
a fuel cell configured to provide electricity to the transport refrigeration unit;
one or more supplemental power sources configured to provide supplemental electricity to the transport refrigeration unit; and
a power management module configured to manage the electricity and the supplemental electricity provided to the transport refrigeration unit,
wherein the power management module is configured to detect a condition of the transport refrigeration unit that requires supplemental electricity and provide the supplemental electricity to the transport refrigeration unit from the one or more supplemental power sources;
wherein the condition of the transport refrigeration unit that requires supplemental electricity is at least one of a low load condition, a max load condition, or a rapid ramp condition.

2. The transport refrigeration system of claim 1, wherein the one or more supplemental power sources only provide the supplemental electricity to the transport refrigeration unit during the condition of the transport refrigeration unit that requires supplemental electricity.

3. The transport refrigeration system of claim 1, wherein the power management module is configured to command activation of the one or more supplemental power sources only during the condition of the transport refrigeration unit that requires supplemental electricity.

4. The transport refrigeration system of claim 1, wherein the fuel cell also provides the electricity to the transport refrigeration unit during the condition of the transport refrigeration unit that requires supplemental electricity.

5. The transport refrigeration system of claim 1, wherein the one or more supplemental power sources comprises at least one of:
   an energy storage device configured to store electricity and provide electricity to the transport refrigeration unit;
   a thermal storage device configured to provide cooling for refrigerated cargo space of the transport container using a phase change material; or
   an electric generation device configured to generate electricity and provide the electricity to the transport refrigeration unit.

6. The transport refrigeration system of claim 1, wherein the one or more supplemental power sources comprises an energy storage device configured to store electricity and provide electricity to the transport refrigeration unit.

7. The transport refrigeration system of claim 6, wherein the energy storage device comprises at least one of a battery system or a capacitor.

8. The transport refrigeration system of claim 1, wherein the one or more supplemental power sources comprises an electric generation device configured to generate electricity and provide the electricity to the transport refrigeration unit.

9. The transport refrigeration system of claim 8, wherein the electric generation device comprises at least one of an axle generator or a hub generator.

10. A method of operating a transport refrigeration system, the method comprising:
    providing electricity from a fuel cell to a transport refrigeration unit, the transport refrigeration unit configured to provide conditioned air to a refrigerated cargo space of a transport container;
    powering the transport refrigeration unit using the electricity from the fuel cell;
    detecting a condition of the transport refrigeration unit that requires supplemental electricity, wherein the condition of the transport refrigeration unit that requires supplemental electricity is at least one of a low load condition, a max load condition, or a rapid ramp condition;
    providing supplemental electricity from one or more supplemental power sources to the transport refrigeration unit during the condition of the transport refrigeration unit that requires supplemental electricity; and
    powering the transport refrigeration unit using at least the supplemental electricity from the one or more supplemental power sources during the condition of the transport refrigeration unit that requires supplemental electricity.

11. The method of claim 10, wherein the one or more supplemental power sources only provide the supplemental electricity to the transport refrigeration unit during the condition of the transport refrigeration unit that requires supplemental electricity.

12. The method of claim 10, further comprising:
    activating of the one or more supplemental power sources only during the condition of the transport refrigeration unit that requires supplemental electricity.

13. The method of claim 10, further comprising:
    providing the electricity from the fuel cell to the transport refrigeration unit during the condition of the transport refrigeration unit that requires supplemental electricity; and
    powering the transport refrigeration unit using the supplemental electricity from the one or more supplemental power sources and the electricity from the fuel cell during the condition of the transport refrigeration unit that requires supplemental electricity.

14. The method of claim 10, wherein the one or more supplemental power sources comprises at least one of:
    an energy storage device configured to store electricity and provide electricity to the transport refrigeration unit;
    a thermal storage device configured to provide cooling for refrigerated cargo space of the transport container using a phase change material; or
    an electric generation device configured to generate electricity and provide the electricity to the transport refrigeration unit.

15. The method of claim 14, wherein the energy storage device comprises at least one of a battery system or a capacitor, or wherein the electric generation device comprises at least one of an axle generator or a hub generator.

16. A computer program product tangibly embodied on a non-transitory computer readable medium, the computer program product including instructions that, when executed by a processor, cause the processor to perform operations comprising:
    providing electricity from a fuel cell to a transport refrigeration unit, the transport refrigeration unit configured to provide conditioned air to a refrigerated cargo space of a transport container;
    powering the transport refrigeration unit using the electricity from the fuel cell;
    detecting a condition of the transport refrigeration unit that requires supplemental electricity, wherein the condition of the transport refrigeration unit that requires supplemental electricity is at least one of a low load condition, a max load condition, or a rapid ramp condition;
    providing supplemental electricity from one or more supplemental power sources to the transport refrigeration unit during the condition of the transport refrigeration unit that requires supplemental electricity; and
    powering the transport refrigeration unit using at least the supplemental electricity from the one or more supplemental power sources during the condition of the transport refrigeration unit that requires supplemental electricity.

* * * * *